April 12, 1949.   R. E. GILBERTSON   2,466,890
METHOD OF SOLDERING TO A NICKEL ALLOY COIL
Filed Jan. 15, 1945
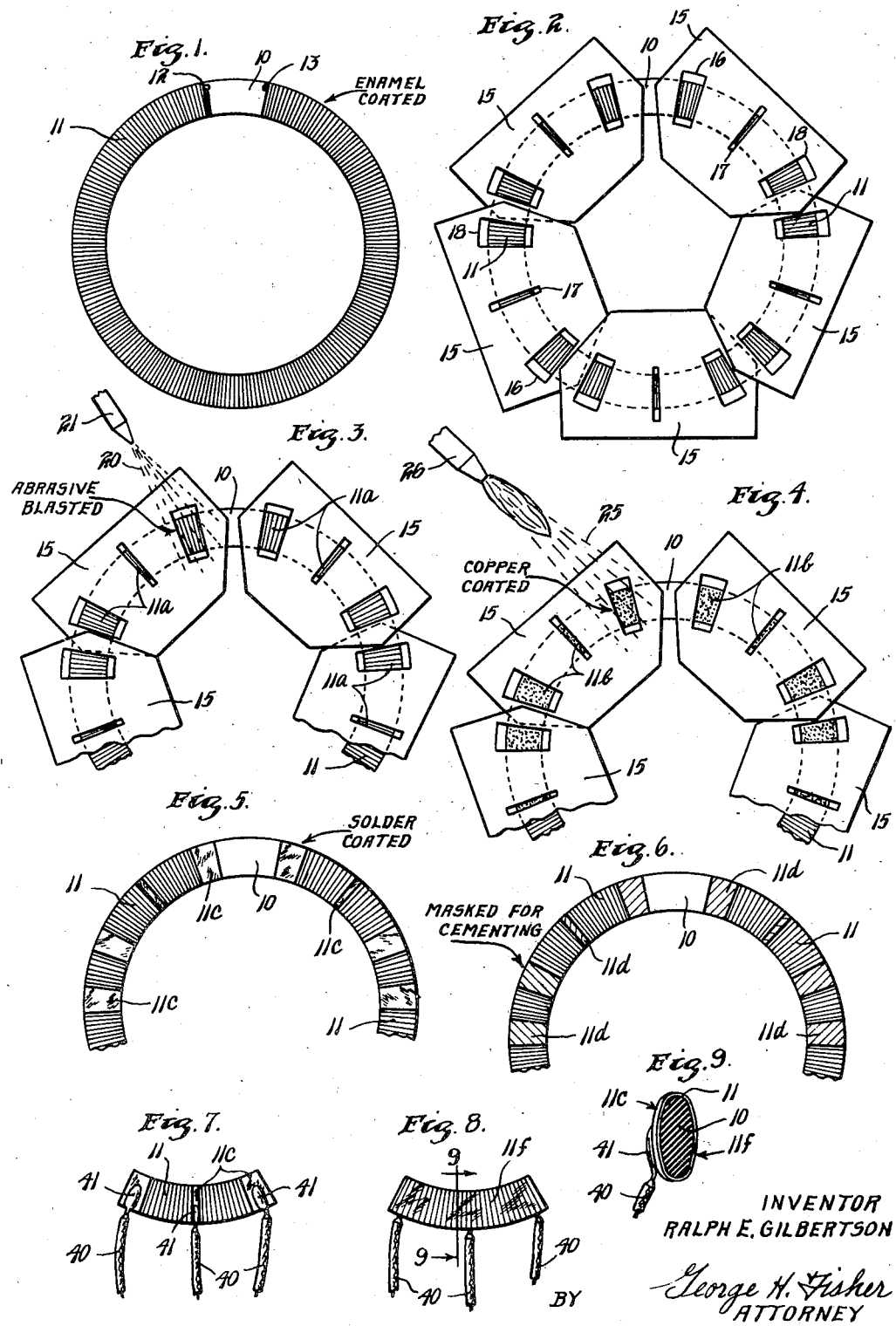
INVENTOR
RALPH E. GILBERTSON
BY George H. Fisher
ATTORNEY Patented Apr. 12, 1949

2,466,890

UNITED STATES PATENT OFFICE 2,466,890

METHOD OF SOLDERING TO A NICKEL ALLOY COIL

Ralph E. Gilbertson, Minneapolis, Minn., assignor to Minneapolis-Honeywell Regulator Company, Minneapolis, Minn., a corporation of Delaware Application January 15, 1945, Serial No. 572,913

2 Claims. (Cl. 113—112)

My invention is related to an improved method of soldering and particularly to a method for applying solder to a surface which does not readily bond with solder.

There exists a class of metals which are difficult to bond by solder of the conventional type composed of tin and lead alloys. This class will include for example, aluminum, certain varieties of stainless steel and especially alloys formed principally of nickel and having the remainder composed substantially of chromium and/or iron. An example of the latter is a material known commercially as "Nichrome." Certain of these metals can be more easily soldered by the additional use of various types of acid flux. However, after soldering in this manner it is often difficult to remove the acid flux from the surrounding parts of the metal surface and therefore the residual acid will corrode these exposed parts. This is particularly true if the object or mechanism which has been soldered with an acid flux is exposed to a hot moist atmosphere. The damage which results from this corrosion may be of great consequence for if the corroded portions form essential parts of a complex electrical circuit mechanism the entire mechanism will become inoperative.

The present invention is applicable to a method of soldering to any of the metals of the above type, or even to certain non-metals should it be desirable for any reason to bond certain non-metallic objects by a soldering process. The only flux material which need be used for soldering to metal surfaces by my method is a conventional and non-harmful rosin-type of flux or other material of this nature.

The method of soldering which forms the present application may be carried out by roughening the surface with an abrasive material and then applying to the roughened surface of the object to be soldered a layer of physically deposited molten metal of a type which is easily soldered, then with an application of a mild flux the solder may be bonded to the thin layer of physically deposited metal.

In order to illustrate this method of soldering, it is herewith disclosed in one form as being applied to a method of soldering lead wires to a wire potentiometer core winding composed of an alloy of high nickel content, the remainder of which is principally chromium and/or iron, but it should be understood that it is not restricted to the sole disclosure and may in fact be applied to any form of object of whatever composition which is capable of supporting a layer of physically deposited metal.

It is recognized that it is old in the art to apply a primary layer of metal having affinity for solder to the surface of an object which does not have affinity for such metal, by such methods as electromechanical or chemical deposition, but such methods have not been entirely successful, and furthermore certain of these prior methods could not be applied to non-conducting material.

An object of my invention is to provide a method of bonding an object with solder by physically depositing a layer of metal having affinity for solder on to a prepared surface of said object and then bonding with solder to the applied metal layer.

Another object is to provide a method of soldering to a metal surface without the use of a corrosive flux.

A further object is to provide a method of soldering to a metal surface such as a fine wire continuously wound on a non-conductive surface, without the use of corrosive material and in a manner applicable to mass production.

Other and further objects will become apparent from the following specification and claims and from the appended drawings which illustrate the process in one form and in which:

Figure 1 is a plan view of an enameled wire potentiometer core winding composed of an alloy of high nickel content, the remainder of which is principally chromium and/or iron;

Figure 2 shows a series of cardboard masks adhesively applied to one side of the winding;

Figure 3 shows a process of abrasively blasting the unmasked portions of the enameled winding;

Figure 4 shows one method of physically depositing a layer of metal to the abrasively roughened surface;

Figure 5 shows a coating of solder applied to the deposited metal layer;

Figure 6 shows a means of masking the soldered surfaces prior to a process of cementing the winding to the core structure;

Figure 7 shows a segment of the core structure with lead wires being fastened to the soldered surfaces;

Figure 8 is a reverse side of the structure shown in Figure 7 with the rear of the core winding burnished for wiping contact;

Figure 9 is a cross-section taken on the line 9—9 of Figure 8.

Referring to the drawings, the various figures illustrate the consecutive steps by which a potentiometer winding may be soldered and prepared by mass production methods. A flat circular Bakelite core 10, which is shown in cross section in Figure 9 is provided with a spiral winding 11 of enamel coated wire composed of the above mentioned alloy of high nickel content, the remainder of which is principally chromium and/or iron, which is started by fastening in a small hole in the core designated by the reference numeral 12 and completed at another small hole designated by the reference numeral 13. A series of masks 15 formed of adhesive cardboard and provided with apertures 16, 17, and 18 are circumferentially mounted on the core winding in such a manner as to leave certain measured portions of the enameled wire 11 exposed through the apertures 16, 17 and 18, as shown in Figure 2.

Referring now to Figure 3 the portions of the enameled wire 11 exposed by the apertures 16, 17, and 18 of the mask 15 are subjected to an abrasive blast 20 emanating from the pipe 21 to remove the enamel and also to produce a roughened surface 11a. While various forms of abrasive material may be used for this purpose, for this particular application aluminum oxide is the preferred abrasive, in that I have found that it gives the most desirable results.

Referring now to Figure 4 the abrasively roughened surfaces of wire 11a are sprayed with a coating of molten copper 25 which is sprayed in a well-known manner from a commercially available device in which a copper wire is continuously fed into the flame of an oxy-acetylene blow torch and sprayed by the force of the flame as represented by reference numeral 26 to produce a metallized surface 11b. The molten copper readily attaches itself to the roughened surfaces of the wire produced by the abrasive blasting and it also flows in and around the crevices between the wires so as to form a mat-like structure and thus attach itself to the Bakelite core 10. While I have illustrated one method of metallizing the wire surface by the use of a spraying device which is incorporated with an oxy-acetylene blow torch, the molten metal might also be attached by other means such for example as by evaporation in a vacuum wherein the molecules of molten metal will be forcibly driven against the desired surfaces.

Referring now to Figure 5, after the sprayed metal has been applied and cooled, the masks 15 are stripped off and the metallized surfaces are coated, as by the use of a fine paint brush, with a liquid rosin flux and a coating of solder is applied with a small soldering iron to produce the soldered surfaces 11c.

I have found it essential that the desired surfaces be metallized and soldered before cementing the wire 11 which is composed of the previously named high nickel content alloy to the core structure 10 for if the winding is cemented prior to metallizing and soldering the molten metal is incapable of properly surrounding the exposed surfaces as explained above. In order to prevent the cement from attaching itself to the soldered surfaces I apply a peelable adhesive of the class of cellulose acetate or the like, to the soldered surfaces as indicated by the reference numeral 11d. After the peelable coating has been applied and properly dried on the soldered surfaces, the entire core structure is immersed in a liquid cement for sufficient time to allow impregnation, after which the cores are dried and baked. After baking, the peelable layer is removed from the soldered surfaces and the rear side of the winding is cleaned with rotary wire brushes to remove the cement and enamel from the resistance winding to provide a highly polished conductive surface 11f as shown in Figure 8 which is suitable for contact with a potentiometer wiper.

After polishing the rear surface of the winding, the core is cut into segments and the lead wires 40 are attached to the soldered surfaces as shown at 41 by merely heating the solder and implanting a tinned end of the wire 40 into the molten surface, as seen in Figures 7 and 9.

While the process which has hereinbefore been explained as being applicable to soldering lead wires on to a variable resistor wire composed of an alloy of high nickel content, the remainder of which is principally chromium and/or iron, it will be understood by those skilled in the art that it would be equally applicable to plane surfaces, or to other objects which are difficult to bond with solder or which require the use of an acid flux.

I claim as my invention:

1. A process of soldering a conductor to a variable resistor formed of a winding of enameled wire of a high nickel content alloy, comprising, abrasively blasting selected portions of said winding to produce a roughened surface thereon, applying a layer of sprayed molten copper on the said roughened portion of said winding, applying a coating of noncorrosive flux to the deposited copper layer, and bonding said conductor to said flux coated copper layer by solder of the conventional type composed of tin and lead alloys.

2. A process of soldering a conductor to a variable resistor formed of a winding of an insulated wire of a high nickel content alloy, comprising, abrasively blasting said insulated winding to remove said insulation and produce a roughened surface on said winding, depositing in a molten condition on the said roughened portion of said winding a layer of metal having affinity for solder in the presence of noncorrosive flux, applying a coating of a noncorrosive flux to the deposited metal layer, and bonding said conductor by solder to the flux coated deposited metal layer.

RALPH E. GILBERTSON.

REFERENCES CITED

The following references are of record in the file of this patent:

UNITED STATES PATENTS

| Number | Name | Date |
|---|---|---|
| 1,233,803 | Overend | July 17, 1917 |
| 1,948,774 | Siegel | Feb. 27, 1934 |

FOREIGN PATENTS

| Number | Country | Date |
|---|---|---|
| 3,668 | Great Britain | Feb. 14, 1898 |
| 130,586 | Great Britain | June 19, 1919 |
| 206,162 | Great Britain | Nov. 6, 1924 |
| 243,000 | Great Britain | Dec. 2, 1926 |

OTHER REFERENCES

Welding Encyclopedia, 11th ed., 1943, pub. by Weld. Eng. Pub. Co., pp. 377–378. Copy in Div. 14.

Welding Handbook, pub. by Amer. Weld Soc., pp. 587–588. Copy in Div. 14.

Certificate of Correction

April 12, 1949.

Patent No. 2,466,890

RALPH E. GILBERTSON

It is hereby certified that error appears in the printed specification of the above numbered patent requiring correction as follows:

Column 2, line 7, for "electromechanical" read *electrochemical*;

and that the said Letters Patent should be read with this correction therein that the same may conform to the record of the case in the Patent Office.

Signed and sealed this 27th day of September, A. D. 1949.

[SEAL]

THOMAS F. MURPHY,
*Assistant Commissioner of Patents.*